United States Patent [19]
Lu et al.

[11] Patent Number: 5,948,108
[45] Date of Patent: Sep. 7, 1999

[54] METHOD AND SYSTEM FOR PROVIDING FAULT TOLERANT ACCESS BETWEEN CLIENTS AND A SERVER

[75] Inventors: Gin-Pao Lu, Cupertino; Hank Jordan, San Jose; Paul Chu, Saratoga, all of Calif.

[73] Assignee: Tandem Computers, Incorporated, Cupertino, Calif.

[21] Appl. No.: 08/873,446

[22] Filed: Jun. 12, 1997

[51] Int. Cl.[6] ........................ G06F 11/18
[52] U.S. Cl. ............... 714/4; 709/212; 709/227; 370/216
[58] Field of Search ............ 395/200.42, 200.57, 395/200.8, 200.69, 187.01, 182.02, 182.08, 182.11, 182.16, 182.05, 182.07; 370/220, 221, 254, 216, 217, 218, 245, 242; 371/20.6, 25.1, 49.1

[56] References Cited

U.S. PATENT DOCUMENTS

| | | | |
|---|---|---|---|
| 5,235,700 | 8/1993 | Alaiwan et al. | 395/182.11 |
| 5,255,388 | 10/1993 | McLaughlin et al. | 395/182.11 |
| 5,634,052 | 5/1997 | Morris | 395/182.02 |
| 5,661,719 | 8/1997 | Townsend et al. | 370/216 |
| 5,696,895 | 12/1997 | Hemphill et al. | 395/182.11 |
| 5,754,752 | 5/1998 | Sheh et al. | 395/182.02 |

*Primary Examiner*—Robert W. Beausoliel, Jr.
*Assistant Examiner*—Pierre E. Elisa
*Attorney, Agent, or Firm*—Graham & James LLP

[57] ABSTRACT

A method and system for providing a fault tolerant access between network clients and a network server. Accordingly, a preferred embodiment of the present invention, a first primary input/output process (IOP) and a second backup IOP are provided in a first network client. A first backup IOP and a second primary IOP are provided in a second network client. The first backup IOP is a backup of the first primary IOP and the second backup IOP is a backup of the second primary IOP. A first preferred access path between the first primary IOP and the network server as well as a first alternate access path between the first backup IOP and the network server are defined. Similarly, a second preferred access path between the second primary IOP and the network server as well as a second alternate access path between the second backup IOP and the network server are defined. A first network connection between the first primary IOP and the network server is established via the first preferred access path. If the first network connection fails, a first alternate network connection between the first backup IOP and the network server is established via the first alternate access path. In addition, a second network connection between the second primary IOP and the network server is established via the second preferred access path. If the second network connection fails, a second alternate network connection between the second backup IOP and the network server is established via the second alternate access path. The first and second network connections are independent of each other and can be operable at the same time. Additionally, a fault tolerant network system is provided.

26 Claims, 10 Drawing Sheets

METHOD AND SYSTEM FOR PROVIDING FAULT TOLERANT ACCESS BETWEEN CLIENTS AND A SERVER

BACKGROUND OF THE INVENTION

The invention relates to a method and system for providing access between clients and a server, and more particularly, relates to a method and system for providing fault tolerant access between network clients and a dual port network server.

In recent years, network systems have been widely implemented to provide connections for computers in distant areas and to provide Internet series. In a typical network system, a WAN (wide area network) concentrator is used as a diskless network server that connects computers at a first area to those at a second area. A plurality of network clients are also connected to the WAN concentrator. LAN (local area network) segments, each comprising a group of computers, are connected to the WAN concentrator via a network adapter. Each LAN segment may be connected to another LAN segment at another place via the WAN concentrator.

In a typical conventional network system, failure of any process or component on a network connection path, e.g., a failed Ethernet adapter, a failed TCP/IP process, etc., can cause a failure in network connection. As a result, the communication on the network may be interrupted or terminated. This failure could cause serious problems, especially in situations where it is critical to maintain the network connector, e.g., in airlines operations and other on-line transactions.

Accordingly, there exists a need for a method and system that provides fault tolerant network connections so that a single point of failure in a process or a component, for example, would not affect the network connections.

SUMMARY OF THE INVENTION

The present invention provides a method and system for providing a fault tolerant access between network clients and a network server. According to a preferred embodiment of the method of the present invention, a first primary input/output process (IOP) and a second backup IOP are provided in a first network client. A first backup IOP and a second primary IOP are provided in a second network client. The first backup IOP is a backup of the first primary IOP and the second backup IOP is a backup of the second primary IOP. A first preferred access path between the first primary IOP and the network server as well as a first alternate access path between the first backup IOP and the network server are defined. Similarly, a second preferred access path between the second primary IOP and the network server as well as a second alternate access path between the second backup IOP and the network server are defined.

According to a preferred embodiment of the method of the invention, a first network connection between the first primary IOP and the network server is established via a first preferred access path. If the first network connection fails, a first alternate network connection between the first backup IOP and the network server is established via the first alternate access path. In addition, a second network connection between the second primary IOP and the network server is established via the second preferred access path. If the second network connection fails, a second alternate network connection between the second backup IOP and the network server is established via the second alternate access path. The first and second network connections are independent of each other and are operable at the same time.

Furthermore, according to a preferred embodiment of the method of the invention, when one of the network clients is running and the other client is detected as being down, all of the backup processes in the running client are switched to become their respective new primary processes. A preferred access path for a new primary IOP in the running client is re-defined via the new primary processes, and a network connection to the network server is established via the re-defined preferred access path.

The fault tolerant network system according to a preferred embodiment of the invention comprises first and second network clients, a network server, and first and second network adapters. The first network client includes a first primary IOP, a second backup IOP and a first manager process. The second network client includes a first backup IOP, a second primary IOP and a second manager process. The first network adapter is coupled between a first port of the network server and the first and second network clients. The second network adapter is coupled between a second port of the network server and the first and second network clients.

In a preferred embodiment of the network system of the invention, the first manager process defines a first preferred access path between the first primary IOP and the network server via the first network adapter. The first manager process also defines a first alternate access path between the first backup IOP and the network server via the second network adapter. In addition, the second manager process defines a second preferred access path between the second primary IOP and the network server via the second network adapter. The second manager process also defines a second alternate access path between the second backup IOP and the network server via the first network adapter.

According to a preferred embodiment of the network system of the invention, the first manager causes a first network connection to be established via the first preferred access path. If the first network connection fails, the second manager process causes a first alternate network connection to be established via the first alternate access path. Similarly, the second manager process causes a second network connection to be established via the second preferred access path. If the second network connection fails, the first manager process causes a second alternate network connection to be established via the second alternate access path. The first and second network connections are independent of each other and are operable at the same time. Therefore, fault tolerant network connections are provided by the present invention.

Other objects and attainments together with a fuller understanding of the invention will become apparent and appreciated by referring to the following description and claims taken in conjunction with the accompanying drawings.

DETAILED DESCRIPTION OF THE PREFERRED EMBODIMENTS

Figure 1:
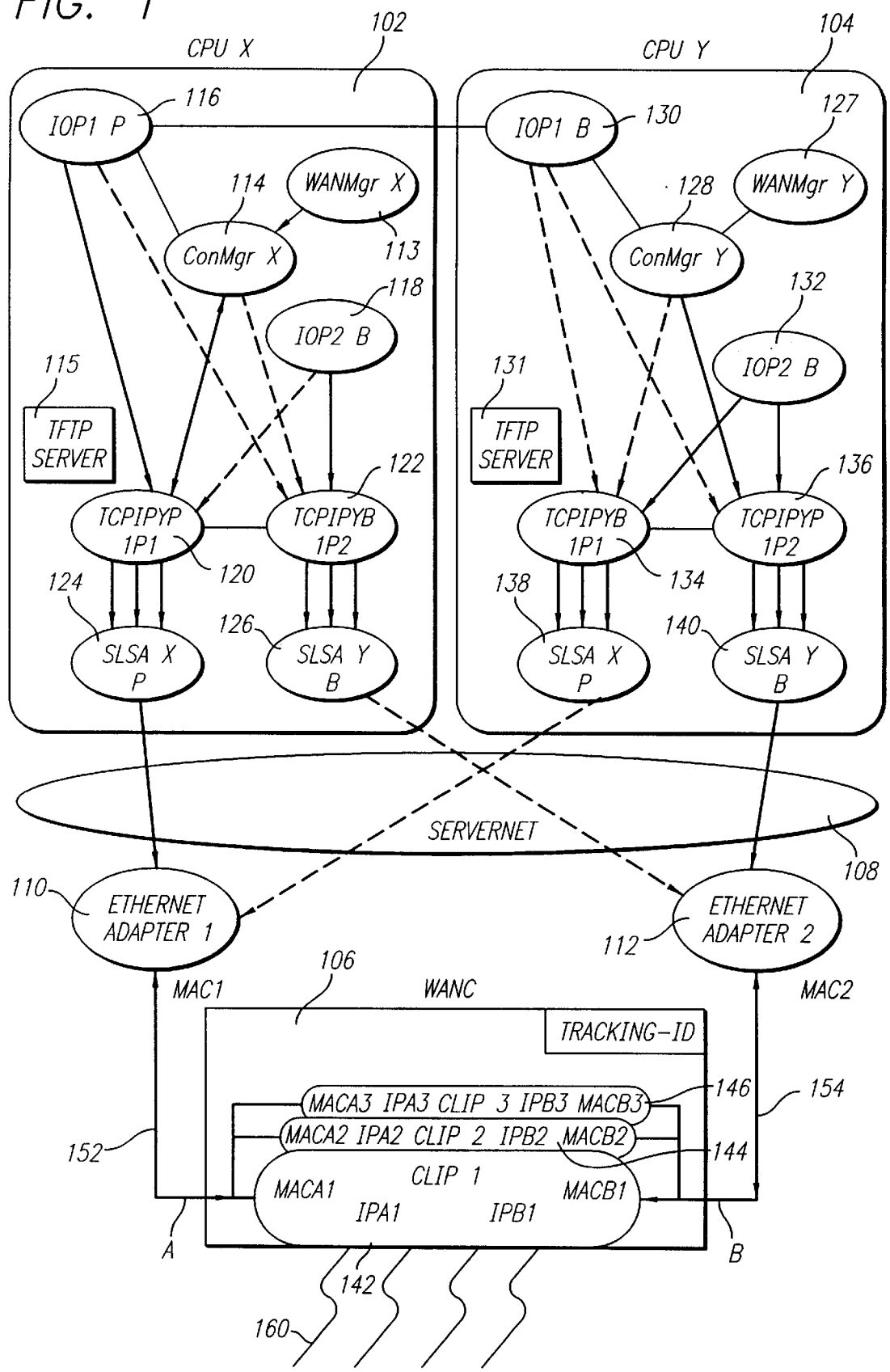
FIG. 1 shows a functional block diagram of a fault tolerant network system according to a preferred embodiment of the invention.

FIG. 1 shows a functional block diagram of a network system for providing fault tolerant access between clients and a server, according to a preferred embodiment of the invention. In FIG. 1, CPU X (102) and CPU Y (104) are coupled to a WAN concentrator (WANC) 106 via a high speed matrix of busses such as a ServerNet 108 and Ethernet adapters 1 and 2 (110, 112). ServerNet 108 is made by and commercially available from Tandem Computers, Inc., Cupertino, California. In this network system, CPU X and CPU Y are network clients and WANC 106 is a network server. WANC 106 is identified by a tracking ID.

In FIG. 1, the essential software processes executed by CPU X for supporting fault tolerant operations include a WAN manager WANMgr X (113), a concentrator manager ConMgr X (114), a TFTP (Trivial File Transfer Protocol) server 115, I/0 processes IOP1 P (116) and IOP2 B (118), TCP/IP processes TCPIP X P (120) and TCPIP Y B (122), and Ethernet interfaces SLSA X P (124) and SLSA Y B (126).

The essential software processes executed by CPU Y for supporting fault operations include a WAN manager WANMgr Y (127), a concentrator manager ConMgr Y (128), a TFTP server 131, I/O processes IOP1 B (130) and IOP2 P (132), TCP/IP processes TCPIP X B (134) and TCPIP Y P (136), and Ethernet interfaces SLSA X B (138) and SLSA Y P (140). These various processes are executed under the control of a local operating system (not shown), such as the NonStop kernel (NSK) developed by and commercially available from Tandem Computers, Inc.

Each WANMgr 113, 127 may be started by the operating system NSK as a subsystem manager and provides the DSM (Distributed System Management) functions for the WAN infrastructure. The DSM management functions allow a user to alter the configuration of WANC 106. Each WANMgr 113, 127 also acts as a database server for supplying configuration information retrieved from a WAN configuration database (not shown) in the local CPU.

Each ConMgr 114, 128 is a process configured by the WANMgr in the local CPU. Each ConMgr 114, 128 supports a structured message interface that controls the access to WANC 106 through the use of SCF (Subsystem Control Facility) commands START, STOP, and ABORT on the local WANMgr. Each SCF process (not shown) in a CPU provides a text and management interface for the WAN infrastructure.

A TFTP server 115, 131 in each CPU is configured for each TCP/IP process that supports the WAN infrastructure. A TFTP server is started as a running process by the local WANMgr. Once it is running, a TFTP server accepts commands from the assigned TCP/IP process and transfers the contents of an identified file from a storage device (not shown) to a requesting WAN CLIP (Communication Line Interface Process).

Each IOP 116, 130 is an input/output process that provides an API (Application Programming Interface) that provides access to an I/O interface, such as a WAN line 160. To establish connection to WANC 106, each IOP issues an ACTIVATE PATH request to the local ConMgr. The local ConMgr automatically selects an available access path to WANC 106, as will be described in detail below.

Each TCP/IP process may be configured by a user to access an associated SLSA (ServerNet LAN System Access). Each is a standard TCP/IP process as defined by RFC (Request for Comment) 793 and 791. Both of these RFCs are hereby incorporated by reference. RFCs are compiled by number by the IETF (Internet Engineering Task Force) and define standards for intercommunication on the Internet and similar networks.

Each SLSA 124, 138 provides an Ethernet interface for the CPUs for communicating with WANC 106. Each SLSA may be accessed by various processes via a respective associated TCP/IP process 120, 134.

In a preferred embodiment of FIG. 1, WANC 106 includes three CLIPs each being identified by a CLIP number, i.e., CLIP 1 (142), CLIP 2 (144) and CLIP 3 (146). Each CLIP provides a processor engine to drive one or more communications line. Each CLIP includes two ports for supporting two I/0 lines. In the described embodiment, each CLIP may be a Motorola M68360 QUICC processor. A MAC (Machine Access Code) address is assigned to each CLIP port during manufacture. A separate IP address (network address) is also assigned to each port A, B in a CLIP during system configuration by a user. The ConMgr 114, 128 in each CPU manages the CLIP if it is connected to that CPU. The ConMgr runs as a context-free server. The various processes in the CPUs and WAN concentrator are described in detail in a co-pending application by the same inventors, entitled "Method and Apparatus for Re-assigning Network Addresses to Network Servers by Re-configuring a Client Host Connected Thereto," Ser. No. 08/857,625, filed on May 20, 1997, which is hereby incorporated by reference.

In FIG. 1, fault tolerant functions are achieved by having one access path from each of the CPU X and CPU Y coupled to one of the Ethernet ports A and B on WANC 106. FIG. 1 shows two WAN IOPs: IOP1 and IOP2. Each WAN IOP will run as a fault-tolerant process pair, i.e., IOP1 P and IOP1 B, IOP2 P and IOP2 B. Each WAN IOP is initially configured to associate with a particular CLIP and a WAN line 160. IOP1 includes a primary IOP1 P (116) and a backup IOP1 B (130). Similarly, IOP2 includes a primary IOP2 P (132) and a backup IOP2 B (118). The preferred access paths of the WAN IOPs are marked by solid arrows. The WAN IOPs do not have any knowledge of the different access paths in the CPUs. That is known only in the WAN configuration database kept by the local WANMgr and accessed by the local ConMgr. A CPU can support several WAN IOPs.

Each WAN IOP relies on the ConMgr in the local CPU to download the DLC (Data Link Control) tasks to the CLIP from a TFTP (Trivial File Transfer Protocol) server 115 in the CPU as will be described below. DLC tasks provide the necessary data link layer functions required for a WAN IOP.

Each DLC task is executed in the CLIP and controls an interface line of WANC 106. Each ConMgr relies on the two TCP/IP process pairs to access the SLSAs which control the Ethernet adapter ports. TCPIP X P and TCPIP Y P are preferred and TCPIP X B and TCPIP Y B are alternate. Each Ethernet adapter port 110, 112 is attached to an Ethernet LAN (152, 154) that connects to one port on WANC 106. An Ethernet LAN 152 or 154 may be connected to a hub (not shown) for connecting a group of computers (instead of a single computer) to the LAN.

A WAN IOP activates an access path by sending an ACTIVATE PATH request to the ConMgr in the local CPU. The ConMgr accesses the WANMgr to select the configuration database records that define the paths. The WAN configuration database accessible by the WANMgr contains the configuration information relating to the fault-tolerant operations, including the configuration objects that define the preferred and alternate paths between an IOP and a CLIP. The configuration database will be described in connection with FIG. 2.

In the normal case, when the ACTIVATE PATH request is received from an IOP by the ConMgr, the ConMgr will honor the IOP's request by initiating the download of DLC tasks from the local TFTP server on the preferred path. The ConMgr may switch to an alternate path due to errors such as an ownership error on the SLSA, a failed TCP/IP process or a missing or failed Ethernet adapter. An ownership error in the SLSA refers to a situation where a wrong CPU is accessed for the SLSA because an SLSA can be accessed only through its configured primary CPU if the primary CPU is running. This routing switch over an alternate path is transparent to the WAN IOP that is activating the path. In either case, if the download of DLC tasks is successful, then the routing information is returned to the IOP by the ConMgr via an ACTIVATE PATH reply. The ACTIVATE PATH reply includes TCP/IP routing information that is used by a WAN shared driver (not shown) linked to the IOP in the CPU for establishing the TCP/IP connections between the IOP and the CLIP via the WAN shared driver. Thus the network connection between the IOP and the CLIP is established.

If the DLC download fails on both the preferred and alternate paths, then the ConMgr will simply return an error to the IOP in the ACTIVATE PATH reply indicating that the paths are down for this CPU. It is then up to the IOP to recover by switching to the backup CPU.

According to a preferred embodiment of the invention, there is only one preferred TCP/IP process for each CLIP in WANC 106. The other TCP/IP process will be the alternate. In a preferred embodiment of the invention, the SLSAs provide management functions that allow an operator in an SCF command to manage the ownership of the SLSAs. This operator provides that the SLSA for a primary IOP be selected for use in a CPU configured as a primary CPU. This preference determines which CPU the SLSA will persistently select as primary when both CPUs are up. In order to maintain the most desirable fault-tolerant operation and performance characteristics, the SLSA must always try to adhere to the configured primary selection. This means that the SLSA will be primary to the CPU that is designated as the configured primary CPU for the Ethernet adapter whenever possible. In the embodiment of FIG. 1, the network connections between IOP1 and WANC 106 and between IOP2 and WANC 106 are independent of each other. At any one time, the two connections can be both active.

Figure 2:
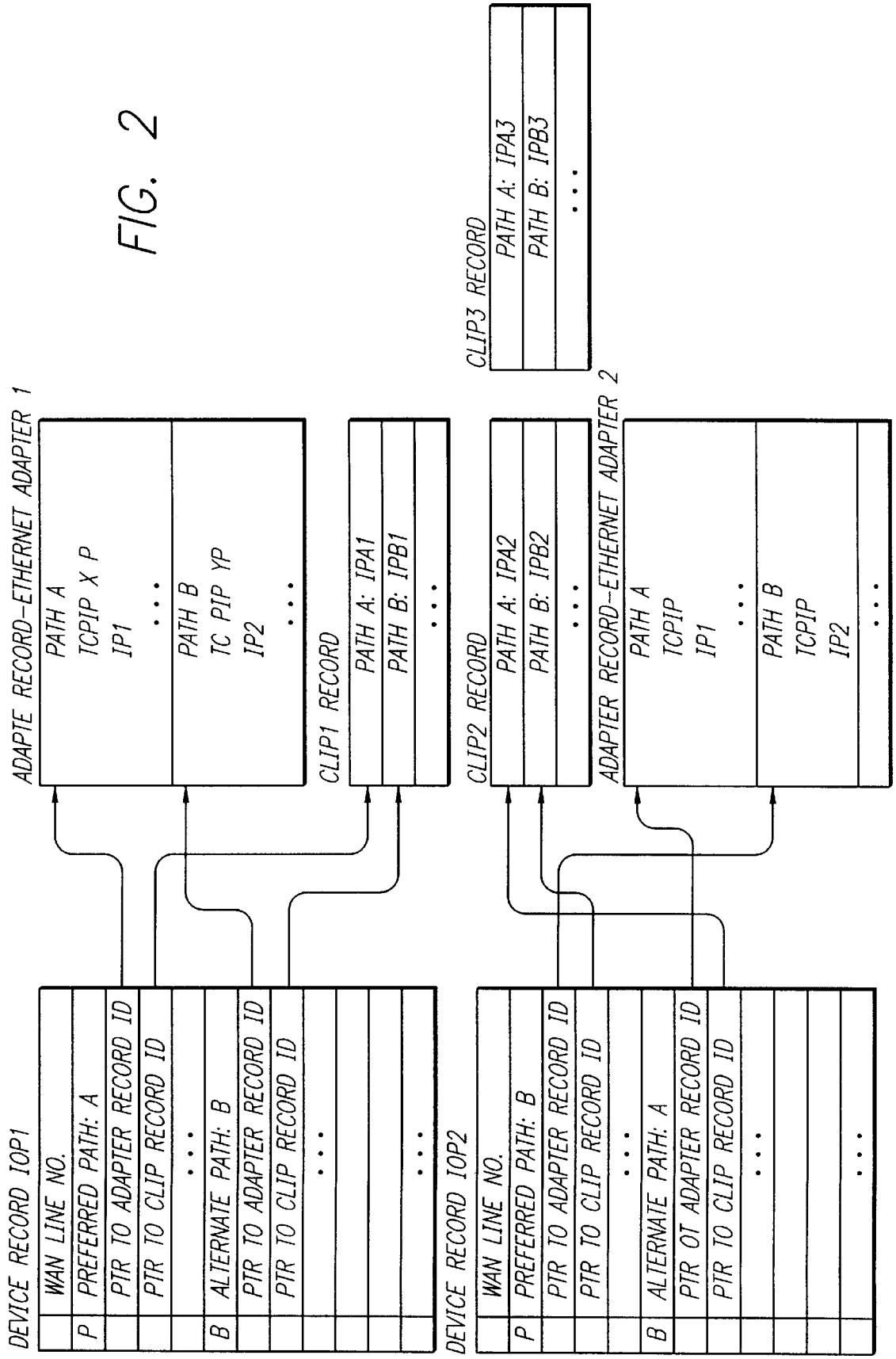
FIG. 2 shows selected records in a configuration database according to a preferred embodiment of the invention.

FIG. 2 shows selected records in the configuration database according to a preferred embodiment of the invention. These records are accessed by a ConMgr via a local WANMgr. When an IOP, e.g. IOP1, issues an ACTIVATE PATH request, the ConMgr, e.g., ConMgr X, accesses the device record associated with IOP1 to obtain information about the preferred access path, e.g., path A for IOP1 and a WAN line 160 number. From the device record for IOP1, the IP addresses of the host (CPU X) and CLIP port (port A), i.e., IP1 and IPA1 are obtained from the associated adapter and CLIP records via the respective pointers. In a preferred embodiment, each TCP/IP process is pre-configured to associate with a particular SLSA. Thus, no specification of a SLSA is needed in the configuration database. If the preferred path fails, the ConMgr obtains information about the alternate access path, e.g., path B for IOP1, in a similar manner. If a particular access path is in use, a flag P or B is set, indicating that a network connection is established via the particular access path.

Figure 3:
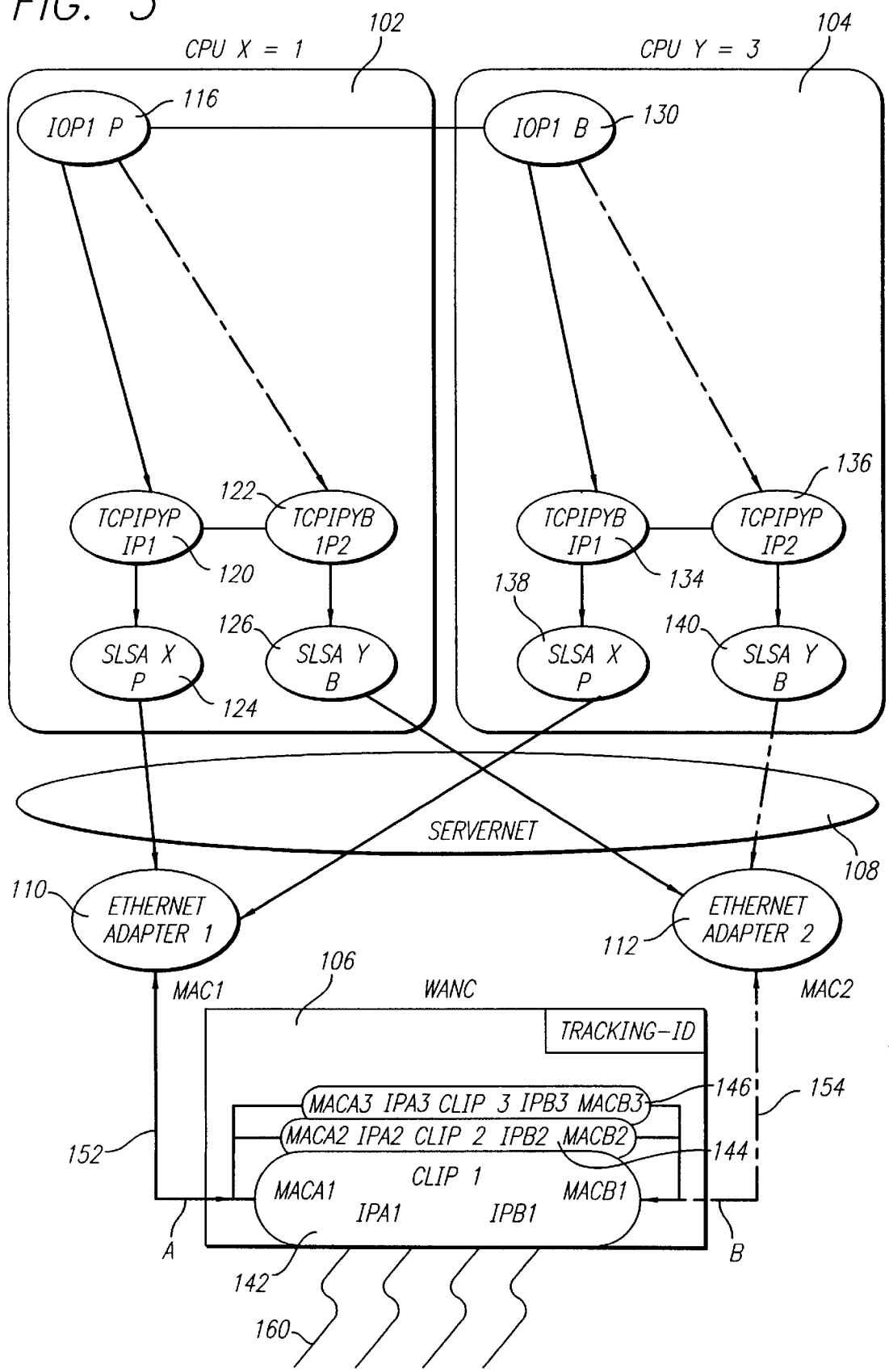
FIG. 3 shows the routing configuration of the fault tolerant network system that is related only to WAN input/output process IOP1 according to a preferred embodiment of invention.

FIG. 3 shows the routing configuration that is related only to IOP1. In this example, IOP1 is configured with a WAN line 160 on CLIP 1 (142) in WANC 106. CLIP 1 is configured with the preferred path (marked by the solid arrows) on TCPIP X P (120) and the alternate path (marked by dashed arrows) on TCPIP Y P (136). SLSA X is configured with its primary CPU on CPU X and its backup CPU in CPU Y. When IOP1 activates the access path, under normal conditions, it will always ask ConMgr X for a download of DLC tasks on the preferred X path as follows:

TCPIP X P.IP1-SLSA X P-ETHERNET ADAPTER1.MAC1←→ WANC.MACA1-IPA1

If the preferred path fails, e.g., if any process on the path fails to function properly, then the network connection may be established via the alternate path as follows:

TCPIP Y P.IP2-SLSA Y P-ETHERNET ADAPTER2.MAC2←→ WANC.MACB1-IPB1

Figure 4:
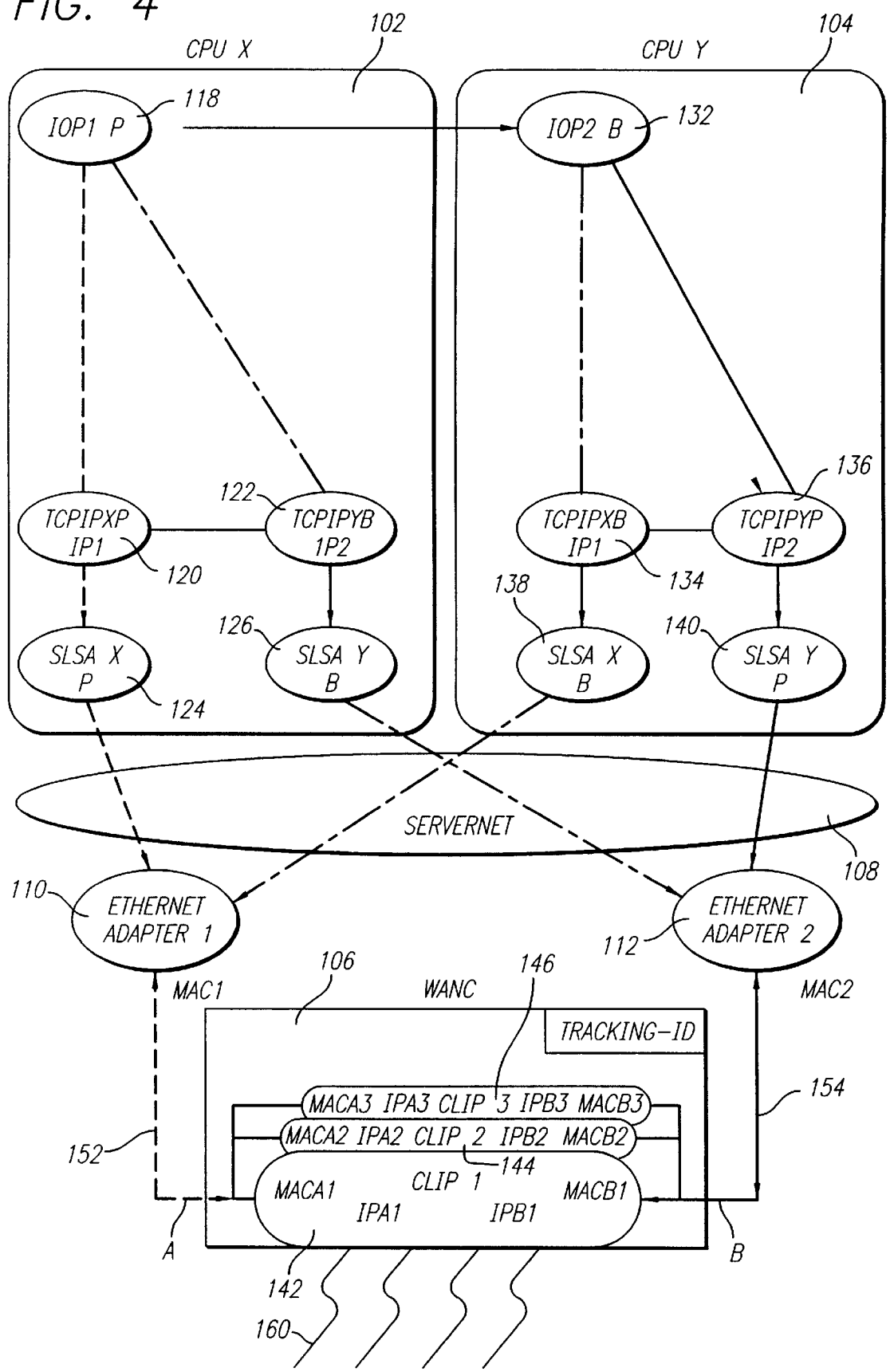
FIG. 4 shows the routing configuration of the fault tolerant network system that is related only to WAN Input/output process IOP2 according to a preferred embodiment of the invention.

FIG. 4 shows the routing configuration that is related only to IOP2. In this example, IOP2 is configured with a WAN line 160 on CLIP 2 (144) in WANC 106. CLIP 2 is configured with the preferred path (marked by the solid arrows) on TCPIP Y P and the alternate path (marked by the dashed arrows) on TCPIP X P. SLSA Y is configured with its primary CPU on CPU Y and its backup CPU in CPU X. When IOP2 activates the access path, under normal conditions, it will ask ConMgr Y for a download of DLC tasks on the preferred path as follows:

TCPIP Y P.IP2-SLSA Y P-ETHERNET ADAPTER2.MAC2←→ WANC.MACB2-IPB2

If the preferred path fails, e.g., if any process on the path fails to function properly, the network connection may be established via the alternate path as follows:

TCPIP X P.IP1-SLSA X-ETHERNET ADAPTER2.MAC1←→ WANC.MACA2-IPA2.

According to a preferred embodiment, there is only one alternate path, but there are four possible configurations as will be illustrated below.

Figure 5:
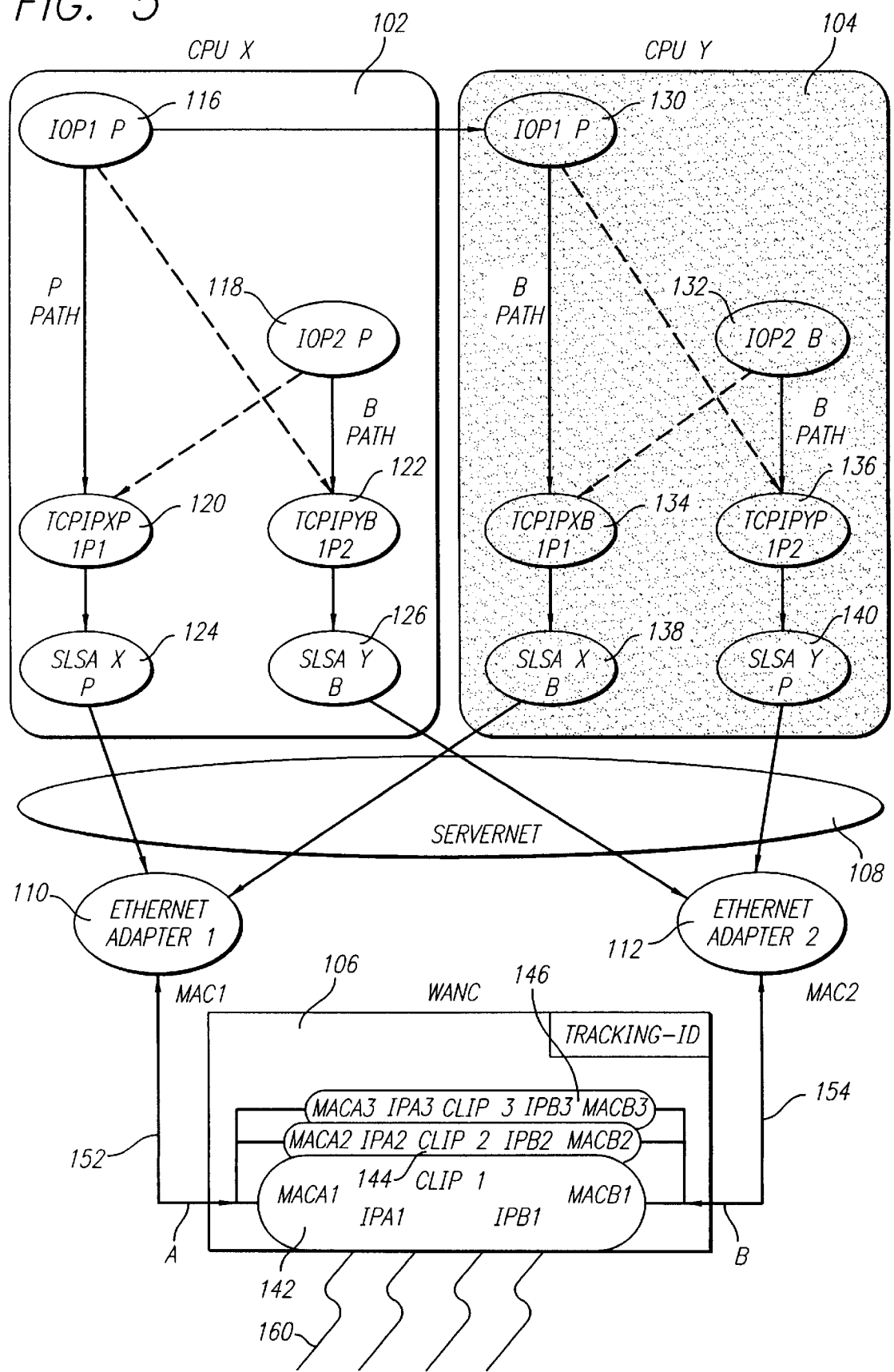
FIG. 5 shows the routing configuration of the fault tolerant network system according to a preferred embodiment of the invention when the system is coldloaded, or when one CPU is down.

FIG. 5 shows the routing configuration when the system is coldloaded, i.e., started up. This condition is similar to the routing configuration when the system had already come up, the WAN IOP processes ran and one CPU (CPU Y) went down. In a preferred embodiment, an operating system, such as an NSK, in each CPU periodically sends messages to the NSK in another CPU. If no response is received from the other CPU, then it is assumed that the other CPU is down. This information is sent by the NSK of the sending CPU to all processes in the sending CPU, including the WANMgr and the ConMgr.

In this case, all the processes will have their primary on the CPU (CPU X) that comes up first or that remains running. Thus, the primary process IOP2 P is not switched to CPU X. All WAN IOPs request downloads of DLC tasks to the respective associated CLIPs through ConMgr X. The ConMgr in CPU X attempts the download on the preferred paths as marked by the solid arrows. For the WAN IOP (IOP2) in CPU Y, the preferred path will be on the configured backup CPU X. SLSA Y B in CPU X has ceased being the backup and has become the primary for the Ethernet adapter 2 when its configured primary CPU Y went down. When CPU Y is reloaded and is up, SLSA Y will switch its process to CPU Y. When the switch takes place, all TCP/IP connections with the CLIP will be affected and new TCP/IP connections will be re-established using the new primary SLSA in CPU Y. The outlined arrows illustrate possible, but unavailable paths.

Figure 6:
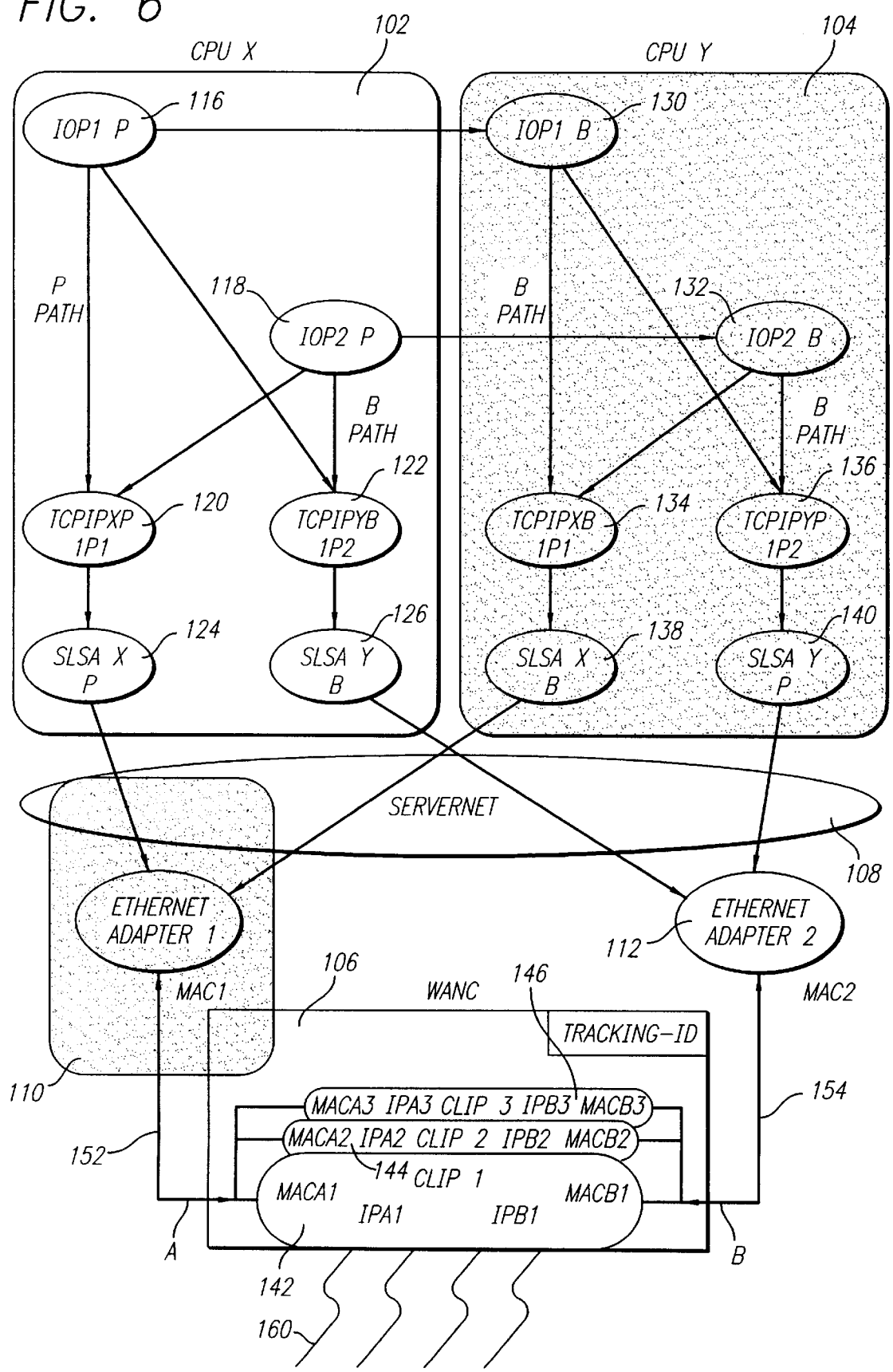
FIG. 6 shows the resulting routing configuration of the fault tolerant network system according to a preferred embodiment of the invention when one CPU and one Ethernet adapter are both down.

FIG. 6 shows the resulting routing configuration when CPU Y and Ethernet adapter 1 are both down. Here, the primary IOP2 (IOP2 P) is switched to CPU X. In this case, IOP1 is on an alternate path (marked by solid arrows) for CLIP 1 and in the configured backup CPU (CPU X) for SLSA Y. IOP2 is on the preferred path for CLIP 2 (marked by solid arrows), but in the configured backup CPU (CPU X) for SLSA Y. This is the only case when all the WAN IOPs go through the same SLSA Y process. The outlined arrows illustrate possible but unavailable paths.

Figure 7:
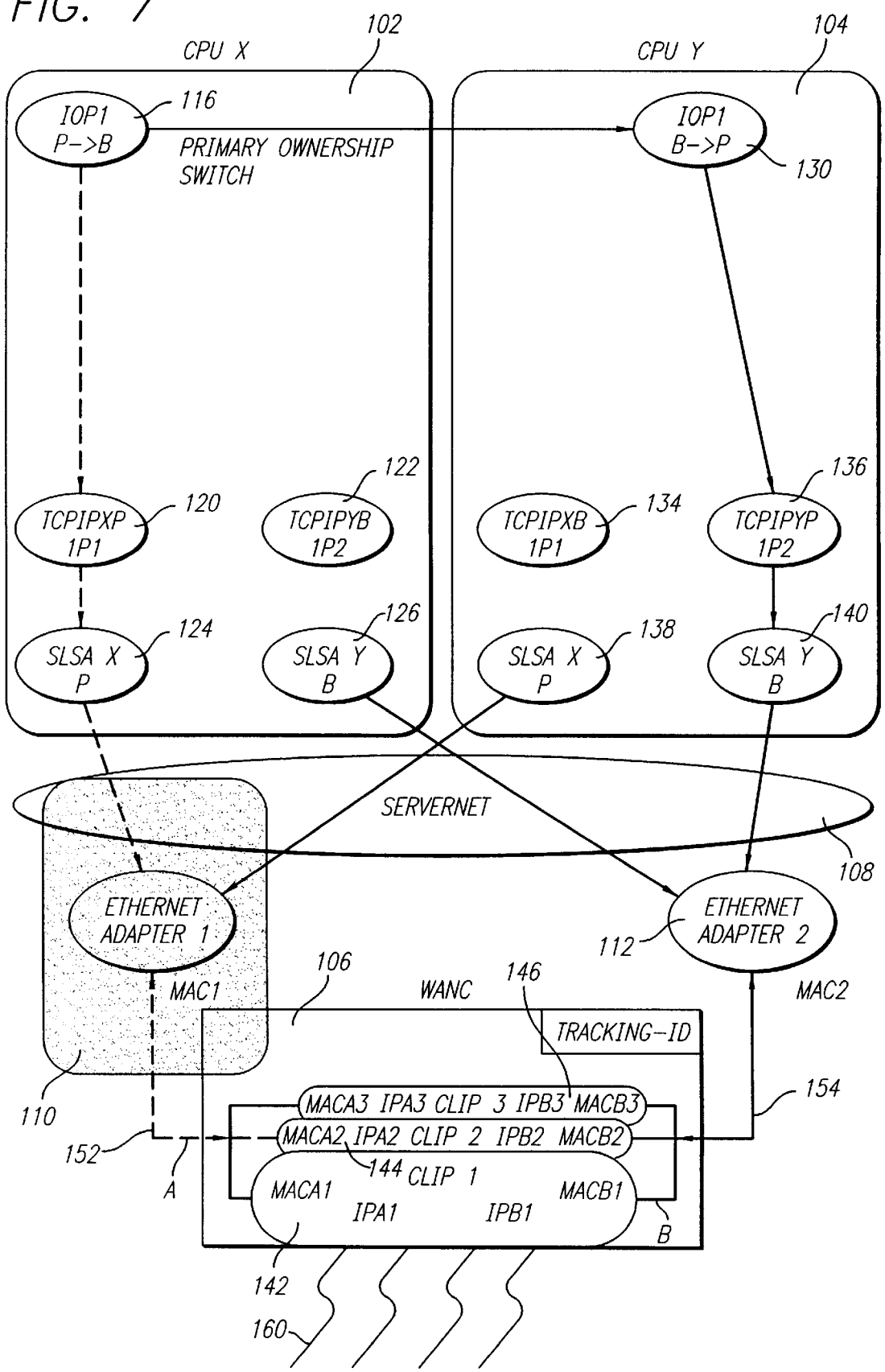
FIG. 7 shows the resulting routing configuration of the fault tolerant network system according to a preferred embodiment of the invention when one Ethernet adapter that is on the preferred path for IOP1 is unavailable.
Figure 8:
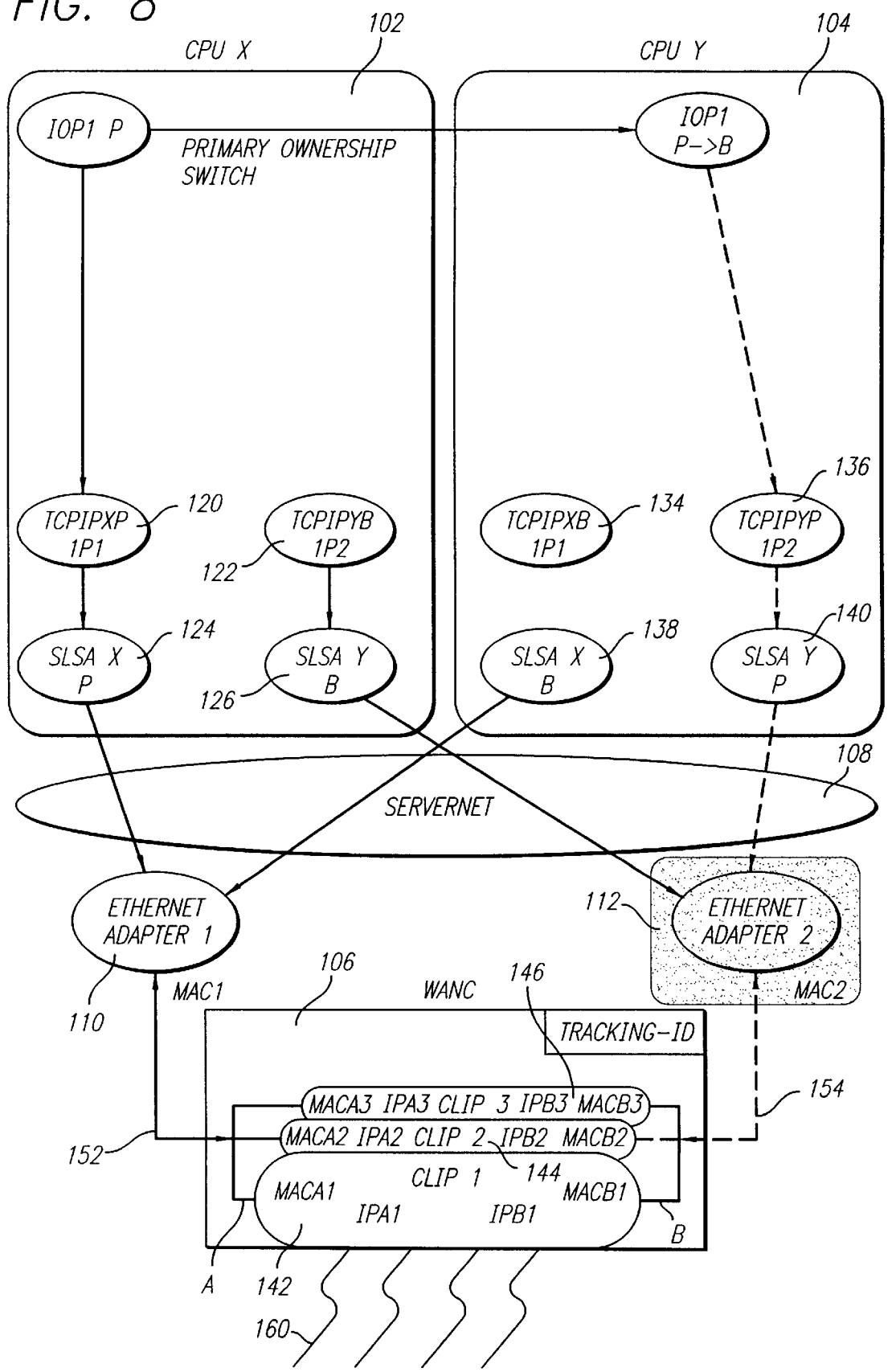
FIG. 8 shows the resulting routing configuration of the fault tolerant network system according to a preferred embodiment of the invention when one Ethernet adapter that is on the preferred path for IOP2 is unavailable.

FIGS. 7 and 8 show the resulting configurations when the Ethernet adapter that is on the preferred path for each IOP becomes unavailable and the IOP recovers on the alternate paths for the CLIPs. As shown in FIG. 7, the preferred path (marked by dashed arrows) for IOP1 fails due to Ethernet adapter 1 being down. An alternate path in CPU X is not accessible since the other primary SLSA process (SLSA Y P) is in CPU Y. That is, IOP1 P in CPU X is switched to become IOP1 B and IOP1 B in CPU Y is switched to become an IOP1 P. Therefore, IOP1 in CPU Y recovers on an alternate path (marked by solid arrows) which the primary SLSA process, i.e., SLSA Y P, controls. In this case, CPU X is still running with the SLSA X P in its configured primary CPU (CPU X).

Similarly, in FIG. 8, the preferred path (marked by the dashed arrows) for IOP2 fails due to Ethernet adapter 2 being down. An alternate path in CPU Y is not accessible since the other primary SLSA process (i.e., SLSA X P) is in CPU X, thus causing ownership to switch. That is, IOP2 P in CPU Y becomes IOP2 B and IOP2 B in CPU X becomes IOP2 P. Therefore, IOP2 recovers on an alternate path (marked by solid arrows) which the primary process, i.e., SLSA X P controls. In this case, CPU Y is still running with the SLSA Y P in its configured primary CPU (CPU Y).

Figure 9:
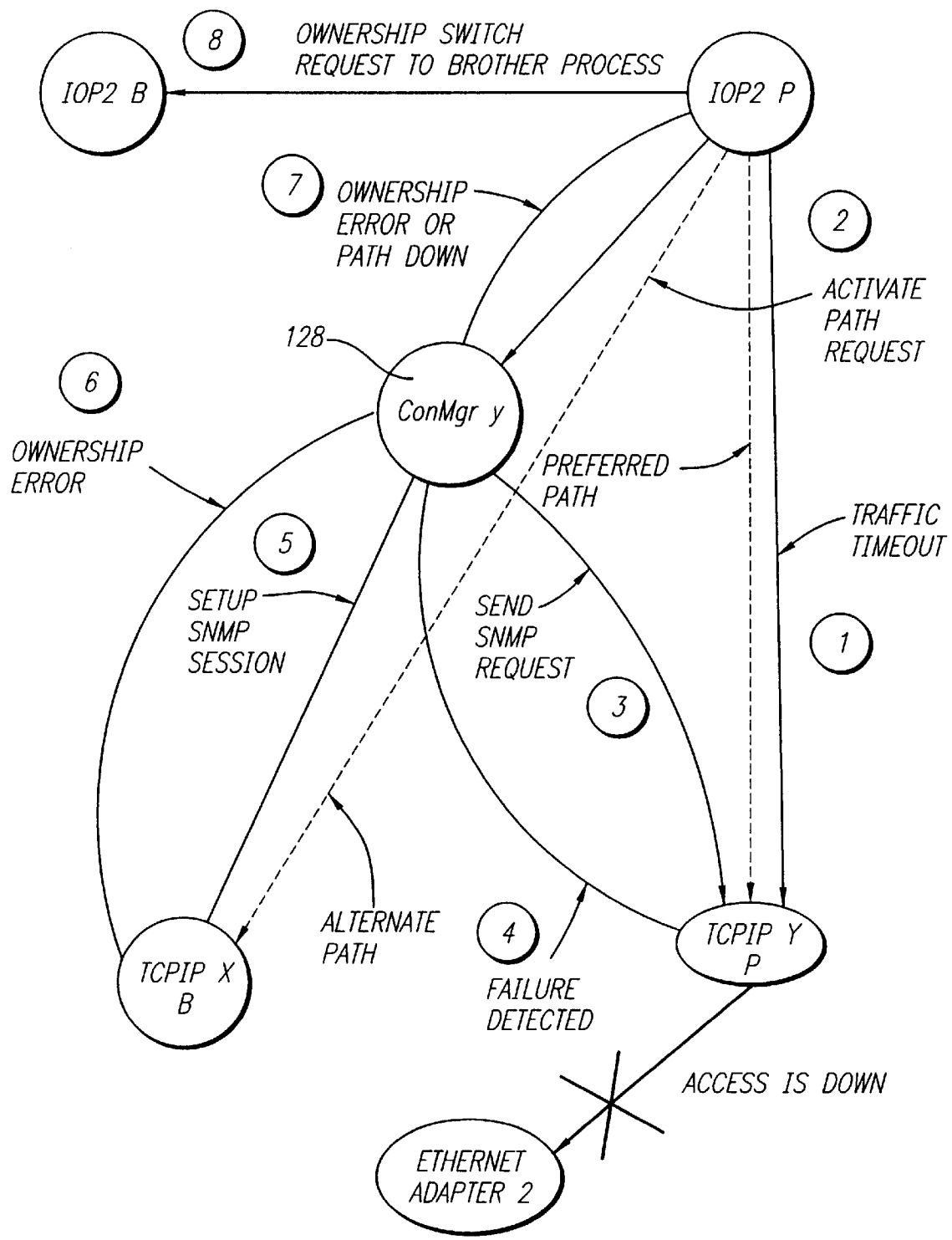
FIGS. 9 and 10 illustrate the sequence of events as a result of a single point of failure in one Ethernet adapter as in FIG. 8.
Figure 10:
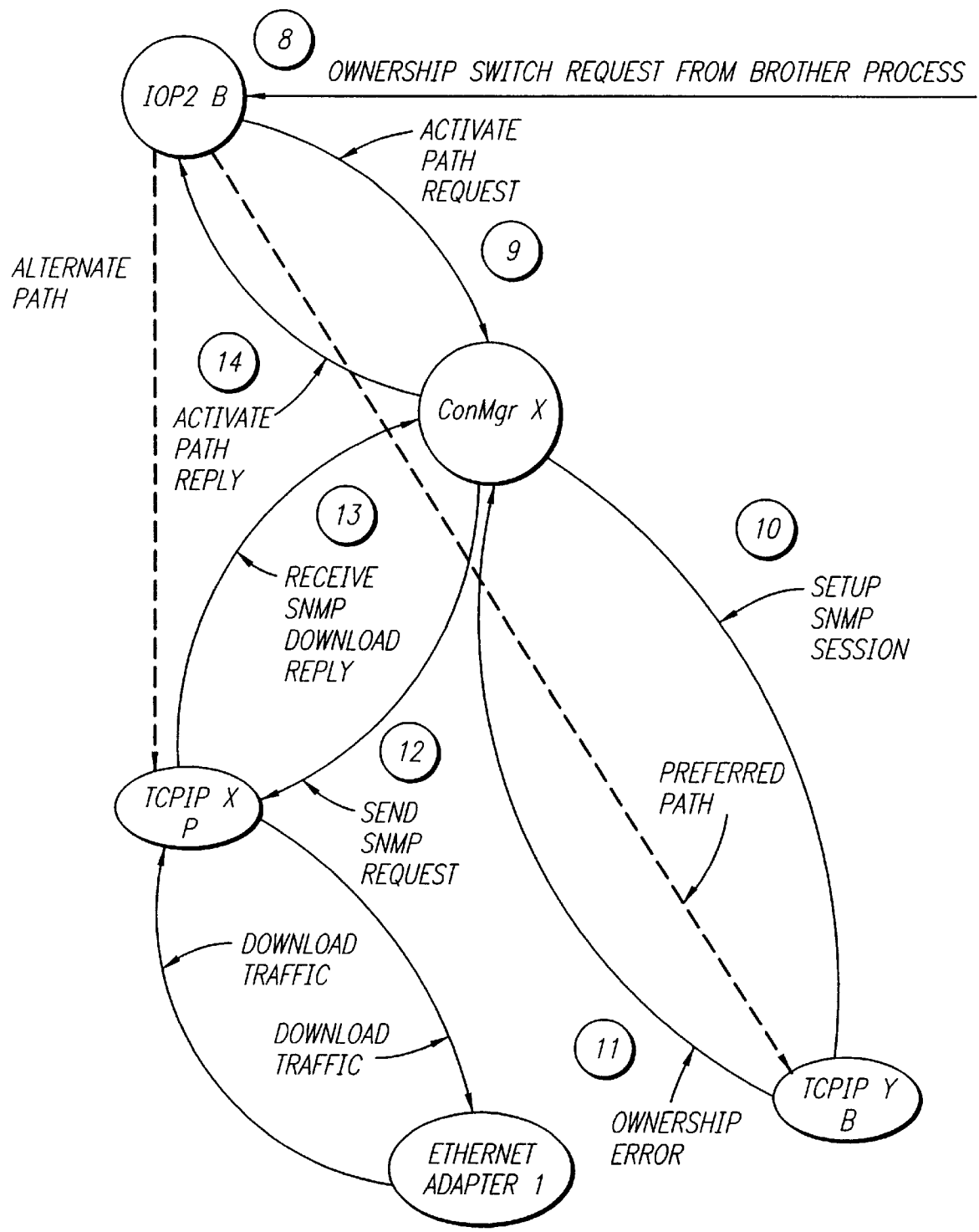

FIGS. 9 and 10 illustrate the sequence of events as a result of a single point of failure (as in FIG. 8) in Ethernet adapter 2 used by IOP2. The failure in Ethernet adapter 2 can be detected in several ways. In FIGS. 9 and 10, it is assumed that IOP2 has already established its TCP/IP session with the DLC task that is downloaded to the CLIP and is passing traffic. A traffic timeout is an example of the type of failure that can occur.

As soon as IOP2 detects the failure in the current path (step 1), without switching the CPU, it requests ConMgr Y to perform a download in the same CPU (CPU Y) (step 2). When an ACTIVATE PATH request is received by ConMgr Y from IOP2, ConMgr Y acquires the preferred and alternate path definitions from the configuration database (not shown) in CPU Y. ConMgr Y initially attempts to use the preferred path for the download. However, it will fail when ConMgr Y attempts to access the SNMP agent (not shown) in the CLIP (steps 3, 4) via TCPIP Y P. The SNMP agent is an agent task that receives requests from the ConMgr for managing WANC 106. The SNMP agent is downloaded from the operating system such as the NSK system in the CPU when WANC 106 is powered on. The SNMP agent is defined by RFC 1157, which is hereby incorporated by reference.

Failing to access the CLIP on the preferred path, ConMgr Y retries the download on an alternate path. However, since it does not have any SNMP session on this alternate path, ConMgr Y must first try to establish the SNMP session (step 5). When TCPIP B fails to talk to the SLSA process (SLSA X B) since the other primary SLSA process (SLSA X P) is in CPU X, ConMgr Y will receive an ownership error (step 6). Thus the download on this alternate path fails. The ownership error (or path down error) is reflected back to IOP2 (step 7). This is an indication that IOP2 must switch to its brother process so that the download can be attempted on the backup CPU (CPU X) (step 8). If CPU X is detected as being down, then at step 5, TCPIP X B is switched to become TCPIP X P. In such a case, ConMgr Y can successfully set up the SNMP session with the CLIP via this new TCPIP X P in CPU Y.

Similar procedures are taken by IOP2 and ConMgr X in the backup CPU, i.e., CPU X as shown in FIG. 10. When the ownership switch request is received by IOP2 B from the brother IOP2 P (step 8), IOP2 B sends an ACTIVATE PATH request to ConMgr X (step 9). Upon receiving the ACTIVATE PATH request, ConMgr X acquires the preferred and alternate path definitions from the configuration database (not shown) in CPU X. ConMgr X initially attempts to use the preferred path for the download by attempting to set up the SNMP session with the CLIP via TCPIP Y B (step 10). When TCPIP Y B fails to talk to SLSA Y B since the other primary SLSA process (SLSA X P) is running in CPU Y, ConMgr X will receive an ownership error from TCPIP Y B (step 11). ConMgr X then retries the download on an alternate path by sending an SNMP request to TCPIP X P (step 12). The SNMP agent in the CLIP sends an SNMP download reply to ConMgr X via TCPIP X P to indicate that access to the CLIP is successful on this alternate path (step 13). ConMgr X then returns the routing information to IOP2 via an ACTIVATE PATH reply. Thus, DLC tasks are downloaded on this alternate path to the CLIP via TCPIP X P and Ethernet adapter 1. Therefore, the system recovers from the error condition. The resulting configuration after successful retry in the example is depicted in FIG. 8. Therefore, the TCP/IP connection is recovered as indicated by the solid arrows in FIG. 8 on CPU X.

TCPIP X P.IP1-SLSA X P-ETHERNETADAPTER1.MAC1←→ WANC.MACA1-IPA1.

While the invention has been described in conjunction with specific embodiments, it is evident that many alternatives, modifications and variations will be apparent to those skilled in the art in light of the foregoing description. Accordingly, it is intended to embrace all such alternatives, modifications and variations as fall within the spirit and scope of the appended claims and equivalents.

What is claimed is:

1. A method of providing fault tolerant access between a first and second network client and a network server, comprising the steps of:
   (a) providing a first primary input/output process (IOP) in the first network client and a first backup IOP, which is a backup of the first primary IOP, in the second network client;
   (b) providing a second primary IOP in the second network client and a second backup IOP, which is a backup of the second primary IOP, in the first network client;
   (c) defining a first preferred access path between the first primary IOP and the network server and a first alternate access path between the first backup IOP and the network server; and
   (d) defining a second preferred access path between the second primary IOP and the network server and a second alternate access path between the second backup IOP and the network server.

2. The method of claim 1, further comprising the steps of:
   (e) establishing a first network connection between the first primary IOP and the network server via the first preferred access path; and
   (f) establishing a first alternate network connection between the first backup IOP and the network server via the first alternate access path if the first network connection fails.

3. The method of claim 2, wherein step (e) comprises the steps of:
   (i) providing a first primary TCP/IP process and a first primary network line interface in the first network client; and
   (ii) linking together the first primary IOP, the first primary TCP/IP process, the first primary network line interface, and the network server to establish the first network connection.

4. The method of claim 2, wherein step (f) further comprises the steps of:
   (iii) providing a second primary TCP/IP process and a second primary network line interface in the second client; and
   (iv) linking together the first backup IOP, the second primary TCP/IP process, and the second primary network line interface, and the network server to establish the first alternate network connection.

5. The method of claim 2, further comprising the steps of:
   (g) establishing a second network connection between the second primary IOP and the network server via the second preferred access path; and
   (h) establishing a second alternate network connection between the second backup IOP and the network server via the second alternate access path if the second network connection fails.

6. The method of claim 5, wherein step (g) comprises the steps of:
   (i) providing a second primary TCP/IP process and a second primary network line interface in the second network client; and
   (ii) linking together the second primary IOP, the second primary TCP/IP process, the second primary network line interface, and the network server to establish the second network connection.

7. The method of claim 6, wherein step (h) further comprises the steps of:
   (i) providing a first primary TCP/IP process and a first primary network line interface in the first client; and
   (ii) linking together the second backup IOP, the first primary TCP/IP process, the first primary network line interface, and the network server to establish the second alternate network connection.

8. The method of claim 7, wherein step (e) comprises a step of:
   (i) linking together the first primary IOP, the first primary TCP/IP process, the first primary network line interface, and the network server to establish the first network connection.

9. The method of claim 8, wherein step (f) comprises the step of:
   (i) linking together the first backup IOP, the second primary TCP/IP process, and the second primary network line interface, and the network server to establish the first alternate network connection.

10. The method of claim 9, further comprising the steps of:
    connecting a first network adapter, at its first terminal, to a first port of the network server, and at its second and third terminals to the first primary and backup network line interfaces, respectively;
    connecting a second network adapter, at its first terminal, to a second port of the network server, and at its second and third terminals to the second primary and backup network line interfaces, respectively;
    wherein each of the network connections to the network server is via one of the first and second network adapters.

11. The method of claim 10, wherein the network server comprises a plurality of communication line interface processors (CLIPs), and each IOP is configured to connect to one of the CLIPs.

12. The method of claim 11, wherein when one of the network clients is running and the other client is down, all of the backup processes in the running clients become their respective new primary processes;
    the method further comprising the steps of:
       re-defining a preferred access path to the network server for a new primary IOP process in the running client via the new primary processes, and
       establishing a network connection to the network server via the re-defined preferred access path.

13. The method of claim 10, wherein the first and second network connections are independent of each other and are operable at the same time.

14. A method of providing fault tolerant network connections, comprising the steps of:
    providing a first pair of input/output processes (IOPs), including a first primary IOP and a first backup IOP, the first primary IOP being provided in a first network client and the first backup IOP being provided in a second network client;
    providing a second pair of input/output processes (IOPs), including a second primary IOP and a second backup IOP, the second primary IOP being provided in the second network client and the second backup IOP being provided in the first network client;
    providing a first pair of TCP/IP processes, including a first primary TCP/IP process and a first backup TCP/IP process, the first primary TCP/IP process being provided in the first network client and the first backup TCP/IP process being provided in the second network client;
    providing a second pair of TCP/IP processes, including a second primary TCP/IP process and a second backup TCP/IP process, the second primary TCP/IP process being provided in the second network client and the second backup TCP/IP process being provided in the first network client;

providing a first pair of network line interfaces, including a first primary network line interface and a first backup network line interface, the first primary network line interface being provided in the first network client and the first backup network line interface being provided in the second network client;

providing a second pair of network line interfaces, including a second primary network line interface and a second backup network line interface, the second primary network line interface being provided in the second network client and the second backup network line interface being provided in the first network client;

connecting a first network adapter, at it first terminal, to a first port of a network server, and at its second and third terminals to the first primary and backup network line interfaces, respectively;

connecting a second network adapter, at its first terminal to a second port of the network server, and at its second and third terminals to the second primary and backup network line interfaces, respectively;

defining a first preferred access path between the first primary IOP and the network server via the first primary TCP/IP process, the first primary network interface line, and the first network adapter;

defining a first alternate access path between the first backup IOP and the network server via the second primary TCP/IP process, the second primary network interface line, and the second network adapter;

defining a second preferred access path between the second primary IOP and the network server via the second primary TCP/IP process, the second primary network interface line, and the second network adapter;

defining a second alternate access path between the second backup IOP and the network server via the first primary TCP/IP process, the first primary network line interface, and the first network adapter;

establishing a first network connection between the first primary IOP and the network server via the first preferred access path;

establishing a first alternate network connection between the first backup IOP and the network server via the first alternate access path if the first network connection fails;

establishing a second network connection between the second primary IOP and the network server via the second preferred access path; and establishing a second alternate network connection between the second backup IOP and the network server via the second alternate access path if the second network connection fails.

15. The method of claim 14, wherein the network server comprises a plurality of communication line interface processors (CLIPs), and each IOP is configured to connect to one of the CLIPs.

16. The method of claim 14,
wherein when one of the network clients is running and the other client is down, all of the backup processes in the running clients become their respective new primary processes;
the method further comprising the steps of:
re-defining a preferred access path to the network server for a new primary IOP process in the running client via the new primary processes, and establishing a network connection to the network server via the re-defined preferred access path.

17. The method of claim 14, wherein the first and second network connections are independent of each other and are operable at the same time.

18. A fault tolerant network system, comprising:
a first network client including a first primary input/output (IOP), a second backup IOP, and a first manager process;
a second network client including a first backup IOP, a second primary IOP, and a second manager process, wherein the first backup IOP is a backup of the first primary IOP and the second backup IOP is a backup of the second primary IOP;
a network server having first and second ports;
a first network adapter coupled between the first port of the network server and the first and second network clients; and
a second network adapter coupled between the second port of the network server and the first and second network clients;
wherein the first manager process defines a first preferred access path between the first primary IOP and the network server via the first network adapter and a first alternate access path between the first backup IOP and the network server via the second network adapter;
wherein the second manager process defines a second preferred access path between the second primary IOP and the network server via the second network adapter and a second alternate access path between the second backup IOP and the network server via the first network adapter.

19. The system of claim 18,
wherein upon a request from the first primary IOP to the first manager process, the first manager process causes a first network connection to be established between the first primary IOP and the network server via the first preferred access path;
wherein if the first network connection fails, the second manager process causes a first alternate network connection to be established between the first backup IOP and the network server via the first alternate access path;
wherein upon a request from the second primary IOP to the second manager process, the second manager process causes a second network connection to be established between the second primary IOP and the network server via the second preferred access path;
wherein if the second network connection fails, the first manager process causes a second alternate network connection to be established between the second backup IOP and the network server via the second alternate access path.

20. The system of claim 19, wherein the network server comprises a plurality of communication line interface processors (CLIPs), and each IOP is configured to connect to one of the CLIPs.

21. The system of claim 19, wherein when one of the network clients is running and the other client is down, all of the backup processes in the running clients become their respective new primary processes, and wherein the manager process in the running client re-defines a preferred access path to the network server for a new primary IOP process in the running client via the new primary processes, and causes a network connection between the new primary IOP and the network server to be established via the re-defined preferred access path.

22. The system of claim 19, wherein the first and second network connections are independent of each other and are operable at the same time.

23. The system of claim 19, wherein the first network client further includes a first primary TCP/IP process, a second backup TCP/IP process, a first primary network line interface, and a second backup network line interface;

wherein the second network client further includes a first backup TCP/IP process, a second primary TCP/IP process, a first backup network line interface, and a second backup network line interface;

wherein the first backup TCP/IP process is a backup of the first primary TCP/IP process, the second backup TCP/IP process is a backup of the second primary TCP/IP process, the first backup network line interface is a backup of the first primary network line interface, and the second backup network line interface is a backup of the second primary network line interface.

24. The system of claim 23, wherein the first manager process defines the first preferred access path via the first primary TCP/IP process, the first primary network line interface and the first network adapter, and defines the first alternate access path via the second primary TCP/IP process, the second primary network line interface and the second network adapter;

wherein the second manager process defines the second preferred access path via the second primary TCP/IP process, the second primary network line interface and the second network adapter, and defines the second alternate access path via the first primary TCP/IP process, the first primary network line interface and the first network adapter.

25. The system of claim 24, wherein when one of the network clients is running and the other client is down, all of the backup processes in the running clients become their respective new primary processes, and wherein the manager process in the running client re-defines a preferred access path to the network server for a new primary IOP process in the running client via the new primary processes, and causes a network connection between the new primary IOP and the network server to be established via the re-defined preferred access path.

26. The system of claim 24, wherein the first and second network connections are independent of each other and are operable at the same time.

* * * * *